Dec. 26, 1967   R. H. SWANSON   3,360,316
ADAPTABLE CLOSURE APPARATUS FOR PRODUCT CABINETS
Filed July 30, 1965   2 Sheets-Sheet 1
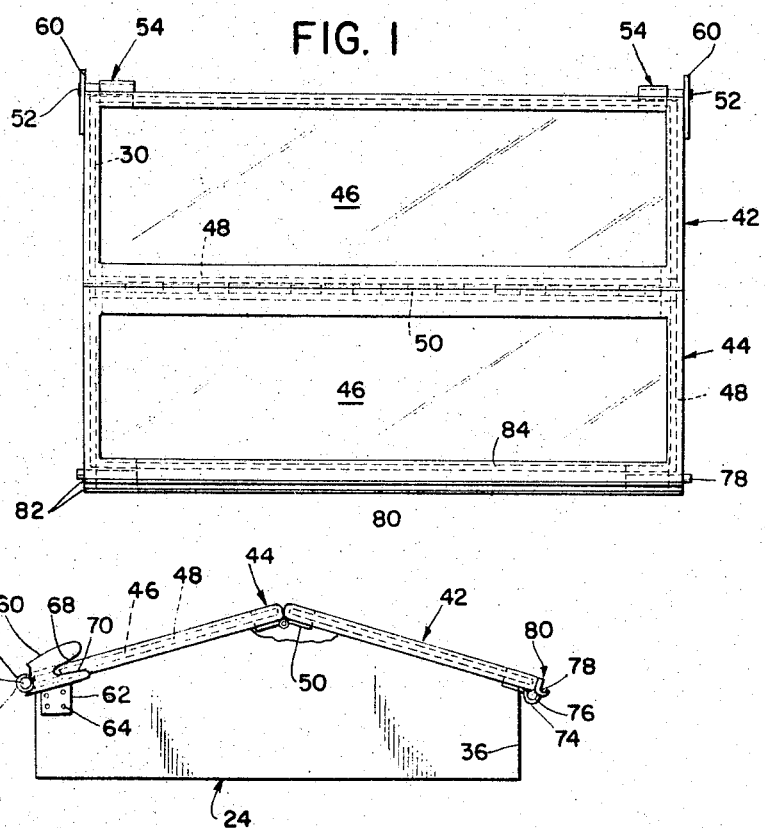
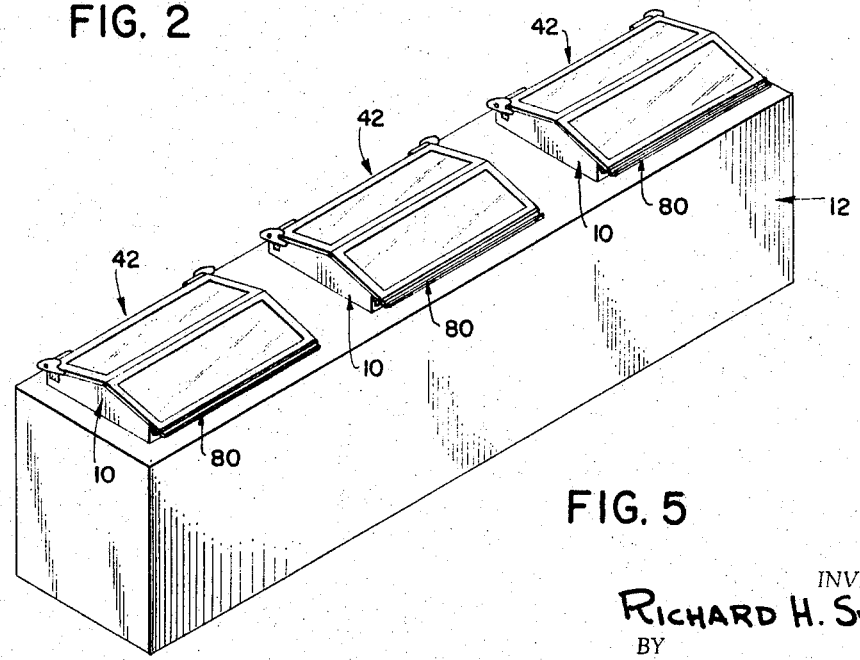
INVENTOR.
RICHARD H. SWANSON
BY
ATTORNEY

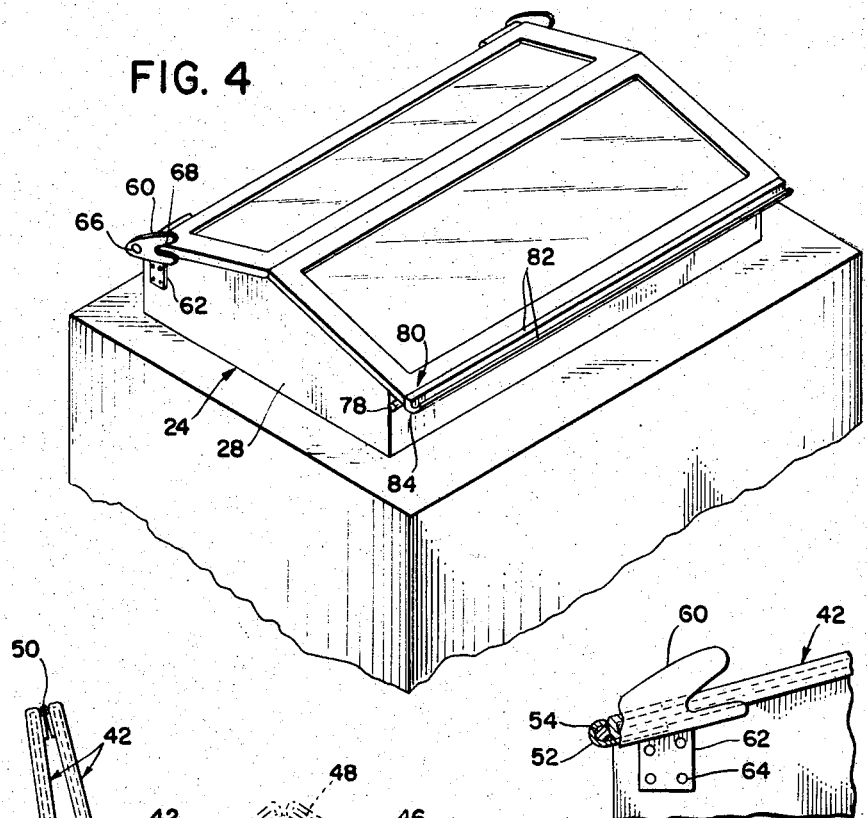
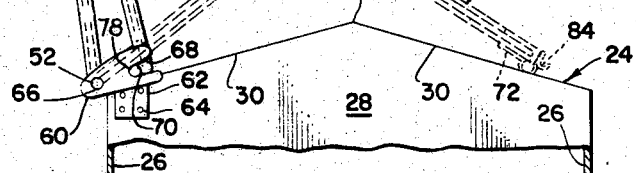
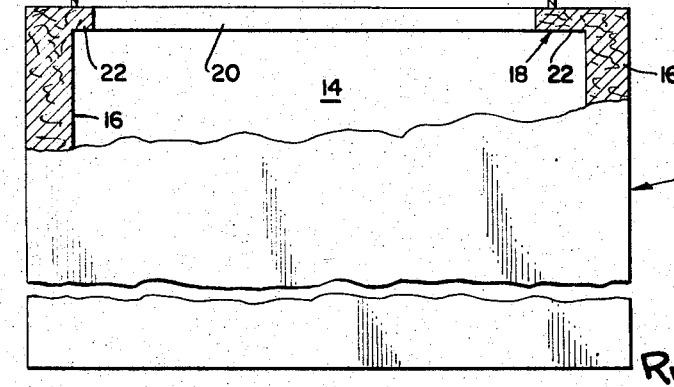

United States Patent Office 3,360,316
Patented Dec. 26, 1967

3,360,316
ADAPTABLE CLOSURE APPARATUS FOR PRODUCT CABINETS
Richard H. Swanson, Manitowoc, Wis., assignor to Manitowoc Company, Inc., Manitowoc, Wis., a corporation of Wisconsin
Filed July 30, 1965, Ser. No. 475,932
18 Claims. (Cl. 312—138)

ABSTRACT OF THE DISCLOSURE

This invention relates to a closure for product cabinets in which the closure comprises a frame extending about an opening in the product cabinet and providing end walls having an apex. A closure is pivotally attached to the frame at the rear of the structure. The closure comprises a plurality of segments pivoted together and is arranged to be disposed in either an open or closed position. The configuration of the closure apparatus is such that the closure is maintained in either the opened or closed position without necessitating the use of biasing means or the like.

Background of prior art

It has heretofore been suggested that cabinets be provided that are particularly adapted to have products, such as frozen products, disposed therewithin. The demand for this type of a cabinet has increased substantially in recent years, inasmuch as a relative plethora of various foodstuffs are made available to the consuming public in frozen food packages. It is, of course, desirable that the various packages of frozen foods be readily visible to the public, enabling a purchaser to readily choose the type of product, quantity, brand, and the like.

Accordingly, cabinets of the aforesaid type that are presently available comprise closure apparatus for enclosing a frozen product zone in which the frozen foodstuffs are disposed. Such closure apparatus may, for example, take the form of sliding doors which inherently present certain disadvantages. For example, the relation of the doors to the frozen product zone is such that some insulation be placed therebetween, lest the differential temperature between the atmosphere and the zone result in a "frosting" or "sweating" of the doors, thus reducing visibility therethrough. It is necessary that a material such as Thermopane be used to eliminate the occurrence of this phenomena. It has even been heretofore suggested that as much as three panes of glass be used, thus introducing the further disadvantage of the likelihood of breakage of the doors, thus further necessitating the use of shatter-proof materials. It can at least be said, therefore, that such closure apparatus as are presently available are costly of fabrication, and even then are not capable of achieving all of the desired results.

Additionally, presently available installations present a drainage problem since moisture or condensation that forms on the doors of the closure apparatus, as a result of the aforesaid temperature differential, finds its way into the frozen product zone. This is particularly true since little, if any, provision is made to produce an efficient result to the contrary. The substantially lower temperature within the frozen product zone causes a solidification of the condensate, particularly upon the packages of foodstuffs. Packages upon which ice has formed can be handled generally only with some discomfort. Moreover, the solidification of condensate that finds its way to between the packages fixes one with respect to the other, introducing the further problem of having to pry them apart.

The use of closure apparatus comprising sliding doors does permit substantial visibility into the frozen product zone. However, simultaneous access into the various compartments of the zone is not possible. It may be said, therefore, that this type of closure apparatus is one enabling only limited access to the frozen product zone of the cabinet at any one time. To provide both substantial visibility into the frozen product zone and to provide substantially simultaneous access thereto, it has been suggested that a closure apparatus be provided comprising pivoted doors. However, in addition to the numerous disadvantages hereinbefore pointed out, it has been found necessary to invoke the use of springs, or other similar biasing means, to retain the doors in at least an open position. This type of cabinet is usually found in establishments, such as stores, in which there occurs a great deal of consumer traffic. Accordingly, the doors of the closure apparatus are subject to substantially constant abuse. Under these conditions, the use of a biasing means, such as a spring, has not been found to be reliable, resulting in a need for frequent repair thereto. Moreover, the doors of existing closure apparatus are usually pivotally associated with the cabinet only at one, namely, the rear edge thereof. The constant opening and closing of this type of door has been found to, in effect, "fan" the cool air from the frozen product zone into the surrounding atmosphere. The resulting tendency of the temperature in the frozen product zone to be reduced below the desired value must therefore be compensated for by causing the compressor unit of a suitable refrigerating apparatus to be rendered operable over substantially increased periods of time. This, in turn, introduces the undesirable characteristic of increased costs.

Summary of the invention

This invention provides a self-positioning and self-retaining closure apparatus for a product structure by providing a frame having inclined upper surfaces which cooperate with a plurality of pivotally interconnected closure members, one of which is mounted for pivotal movement with respect to the frame. The closure member that is mounted for pivotal movement with respect to the frame may be moved from the first position overlying the inclined surfaces to a second position inclined from the vertical in a direction away from the inclined surfaces.

The frosting of the closure structure which is preferably transparent, is achieved by spacing the closure members from the product zone. This is accomplished by utilizing a frame extending above the cabinet.

The accumulation of any condensate on the closure members is accommodated by a trough structure positioned on the free end of the other closure member. The trough structure preferably is disposed beyond the confines of the frame.

It is, of course, desirable to provide a seal between the closure members and the frame to preclude circulation of refrigerated air within the cabinet. In order to simplify the sealing structure, the axis about which the one enclosure member pivots is disposed beyond the confines of the frame so that sealing occurs between the bottom of the closure members in the frame.

It is accordingly a primary object of the present invention to provide adaptable closure apparatus for cabinets, the closure apparatus being so constructed and arranged as to be self positionable in a closed position as well as self retaining in an opened position.

It is another object of the present invention to provide a closure apparatus disposed in spaced relationship relative to a product zone thereby substantially eliminating frosting and sweating of the closure apparatus when the product zone is refrigerated.

A still further object of this invention is to provide a closure structure for cabinets and the like which presents, in the closed position, a configuration inherently tending to drain any liquid material toward the periphery thereof and away from the product zone.

A further object of this invention is to provide a closure structure which is capable of manufacturing units, or in sections of longitudinal extent so that the closure may be adapted to closure of various types and dimensional extents or to existing installations.

A still further object of the present invention is to provide a closure apparatus which is so constructed and arranged as to eliminate the need for installation and/or shatter-proof materials.

Another object of this invention is to provide a closure structure for cabinets and the like which allows simplified sealing construction.

Other objects and important features of the invention will be apparent from a study of the specification following taken with the drawings, which together show, illustrate, describe and disclose a preferred embodiment or modification of the invention and what is now considered to be the best mode of practicing the principles thereof. Other embodiments or modifications may be suggested to those having the benefit of the teachings herein and such other embodiments or modifications are intended to be reserved especially as they fall within the scope and spirit of the subjoined claims.

In the drawings:

FIGURE 1 is a plan view of a closure apparatus constructed in accordance with the principles of the present invention;

FIGURE 2 is an end elevational view of the closure apparatus illustrated in FIGURE 1;

FIGURE 3 is an end elevational view similar to FIGURE 2, partially broken away and drawn to an enlarged scale, illustrating the closure apparatus of the present invention in structural, operative association with a cabinet particularly adapted to have a frozen product disposed therewithin, and showing further the closure members thereof in each of a plurality of positions;

FIGURE 4 is an isometric view showing the closure apparatus of FIGURES 1 through 3 at a unitary section of substantial longitudinal dimensional extent, and in structural operative association with a cabinet;

FIGURE 5 is a view similar to FIGURE 4, but illustrating the closure apparatus of FIGURES 1 through 3 as a plurality of individual units, each being structurally operatively associated with a cabinet; and FIGURE 6 is a partial detailed view, drawn to an enlarged scale, of certain component parts of the present invention.

With reference now to the drawings, there is illustrated therein a closure apparatus 10, constructed in accordance with principles of the present invention, and illustrated, in FIGURES 3, 4 and 5, as being disposed in structural operative association with a cabinet 12, within which various products, such as food products, frozen foodstuffs, and the like, are particularly adapted to be disposed. At the outset, it will be understood that the cabinet 12 may be of any suitable and conventional construction, having a product zone 14 defined by a plurality of side walls 16, and an upper wall 18. An opening 20, extends through the wall 18, the transverse dimensional extent or width thereof being less than the same dimension of the product zone 14. Accordingly, it can be said that the upper wall 18 defines a lip 22 extending generally inwardly of the product zone, which lip is disposed in overhanging or overlying relationship with respect thereto. The opening 20, which provides access to and egress from the product zone 14, may be disposed in an off-center or eccentric relationship with respect thereto, in order to enable the lip 22 generally frontally of the cabinet 12 (viewed substantially at the right in FIGURE 3) to be of greater transverse dimensional extent or width than the lip disposed generally rearwardly thereof (as viewed substantially at the left in FIGURE 3). It will be understood, therefore, that the cabinet 12 can be so constructed and arranged as to enable various articles to be positioned thereupon externally of the product zone 14. The cabinet may comprise, in addition, a suitable refrigerating assembly (not shown) for introducing a desired temperature level in the zone 14, when frozen products are to be disposed therein in a manner considered readily apparent to those skilled in the art.

The closure apparatus 10 comprises a generally rectangularly configured frame 24. The frame, in turn, comprises a plurality of longitudinally dimensionally extensive side walls 26, and a plurality of transversely dimensionally extensive generally triangularly configured end of walls 28. The side walls and end walls may be fixedly structurally operativey associated with one another in any suitable manner. While the frame 24 will be described and disclosed, and is illustrated as being of generally rectangular configuration, as pointed out above, it will be understood that it may be of any configuration that corresponds generally with that of the opening or aperture 20.

The end walls 28 each of them are so configured and arranged as to define a plurality of inclined surfaces 30, of substantially the same transverse dimensional extent, disposed generally in obtuse angular relationship with respect to one another, and in a similar angular relationship with respect to a corresponding one of each of the side walls 26. The surfaces 30 therefore define an apex 32 therebetween. It will now be understood that, while the frame 24, and thus the end walls 28, are drawn to an enlarged scale in certain of the figures of the drawings to facilitate an understanding of the present invention, the vertical dimensional extent or height from the base of the triangle defined thereby to the apex 32 is preferably of the order of two inches.

The closure apparatus 10 comprises, further, a plurality of longitudinally dimensionally extensive generally rectangularly configured closure members 42 that are particularly adapted to be translatable between a plurality of positions with respect thereto, namely, a closed position, and an open position, as will hereinafter be more fully described. The closure members may be fabricated in any suitable manner, and of any suitable material, and preferably comprise an opaque substantially continuous border portion 44 of generally rectangular configuration, and a transparent portion 46, particularly adapted to be fixedly structurally operatively associated therewith. This may be accomplished in any suitable manner, and, to this end, the opaque border portion 44 may be provided with a channel 48. The border portion may be fabricated of any suitable material, and, for example, may be fabricated of wood, metal and the like. Similarly, the transparent portion 46, may be fabricated of any suitable material having substantially only the requisite characteristic of transparency. Accordingly, this portion may be fabricated of a plastic material such as Plexiglas, this is not subject to breakage or damage, and, therefore, introduces a safety factor as well. For reasons that have been briefly alluded to hereinbefore and which will be described more fully hereinafter, the closure members 42 and particularly the transparent portions 46 thereof, will not be subject to "frosting" or "sweating." At this point, it is noted that the closure members are of substantially the same longitudinal dimensional extent or length as the frame 24. It may be desired, and even preferred, that this dimension of the closure members be slightly greater than the same dimension of the frame, enabling the presentation of an "overhang" with respect thereto. As a result, a more effective seal can be established therebetween. In addition, the transverse dimensional extent or width of each closure member is substantially the same as the longitudinal dimensional extent or length of a corresponding one of the inclined surfaces 30. Again, the relative dimensions therebetween may be varied to enable the presentation of an "overhang" generally rearwardly of the frame (as viewed at the left of FIGURE 3 for example), and generally frontally thereof (as viewed at the right of that figure).

The closure members 42 are particularly adapted to be pivotally structurally operatively associated with respect to one another. To this end, a piano-type of hinge assembly 50 is positioned between the closure members and structurally operatively associated therewith in any suitable manner.

Additionally, one of the closure members 42, and particularly that one thereof, disposed generally rearwardly of the cabinet 12 (as viewed generally at the left of FIGURE 3, for example), is particularly adapted to be pivotally structurally operatively associated with the frame 24. To this end, that closure member, which may be denoted as a generally rearwardly disposed closure member in order to facilitate an understanding of the present invention, comprises a plurality of pivot pins 52 particularly adapted to be fixedly structurally operatively associated therewith, and at each end thereof. The pins 52 may be fixedly associated with the member 42 in any suitable manner, and, for example, a mounting bracket 54 of generally J-shaped configuration may be fixedly positioned on the undersurface of the border portion 44 thereof. The bracket 54 is so configured and arranged as to define a bight 56 that is particularly adapted to cooperate with the border portion adjacent thereto to define in turn a groove 58 therewith, within which the pin 52 is particularly adapted to be disposed. Of course, the distance between the bight 56 of the bracket 54 and the border portion 44 is such as to insure that the pin 52 will be fixedly retained therebetween.

As hereinbefore pointed out, the rearwardly disposed closure member 42 is particularly adapted to be pivotally structurally operatively associated with the frame 24. Accordingly, the frame 24 comprises, still further, a bracket assembly 60 particularly adapted to be fixedly structurally operatively associated one with each of the end walls 28 thereof, and particularly adjacent that end of the walls disposed generally rearwardly of the frame. Each bracket assembly is of irregular configuration, and it comprises a generally rectangularly configured integral mounting plate 62, extending generally vertically downwardly therefrom, and having a plurality of apertures 64 extending therethrough. Any suitable fastener (not shown) may be used to fixedly associate the plate, and, thus, the bracket assembly 60 on the end walls 28 of frame 24.

The bracket assembly comprises, further, an aperture 66 positioned generally rearwardly thereof. The location of this aperture relative to the adjacent side wall 26 is of particular significance. Specifically, this aperture is positioned at that location along the longitudinal dimensional extent of the assembly 60 so as to position it outwardly of or beyond the adjacent side wall 26, for reasons that will be pointed out hereinafter. It is within this aperture that a corresponding one of the pivot pins 52 is particularly adapted to be rotatably moveably disposed. Additionally, the assembly 60 comprises a groove or recess 68 disposed generally forwardly thereof, that is, in distal relationship with respect to the aperture 66. This groove is defined, at least in part, by a wall 70 which preferably is disposed in spaced parallel relationship with the adjacent inclined surface 30, for purposes that will more fully be described hereinafter. The other closure member 42 (the aforesaid one closure member 42 has been denoted as a generally rearwardly disposed closure member) is particularly adapted to be translated along the inclined surfaces 30 when the closure members are translated from a closed position relative to the frame 24, to an open position with respect thereto. It is therefore desirable that any friction therebetween be kept at a minimum. Accordingly, and to that end, a mounting bracket 72 is fixably positioned upon the under-surface of the border portion 44 of this closure member, which now is denoted as a generally forwardly disposed closure member, in order to facilitate an understanding of the present invention, one at each end thereof. This bracket may be of any suitable construction and configuration, and preferably is so configured and arranged as to present a hook or looped portion 74 that is particularly adapted to define a groove or recess 76 with the under-surface of the aforesaid border portion. An antifriction slide bar or roller 78 is particularly adapted to be disposed within each of the grooves 76. This bar or roller may be fabricated of any suitable materials, as long as it possesses the requisite characteristic of maintaining the friction with the surfaces 30, when the bar is translated therealong, at a minimum. This may be unusually efficiently accomplished by rotatably positioning the bar or roller 78 within the groove 76. Irrespective thereof, however, each end of the hooked or looped portion 74 may be closed (not shown), in any suitable manner, and that portion of the bar disposed therewithin fabricated of an enlarged diametral dimensional extent to preclude the inadvertent removal therefrom.

The closure members 42 are pivotally translatable between a plurality of positions, as will presently be described. In either position, however, they are inclined with respect to the horizontal. Accordingly, any material that is disposed or that forms thereupon, will tend to move in the direction of the incline. For example, if the product zone 14 is a refrigerated one, condensate may form on the closure members, though the quantity thereof will be relatively insignificant, for reasons that will be described hereinafter. It is desirable that this material be drained away neatly and efficiently, particularly at the front of the cabinet 12, and, to this end, a drain trough 80 is particularly adapted to be fixedly positioned upon the border portion 44 of the forwardly disposed closure member 42 in any suitable manner. Trough 80 may be of any suitable construction, fabricated of any suitable material, and, for example, may be of J-shaped configuration. Accordingly, there is defined a plurality of legs 82, and a bight 84. The trough 80 is particularly adapted to perform a plurality of functions, and specifically the functions of being suitable as a handle for moving the closure members 42 between the positions thereof, all presently to be described. With respect to its function as a drain trough, it will be understood that the bight 84 can be gently inclined relative to the horizontal, enabling any materials that collect therewithin, such as condensate, to be directed to one end for collection.

As hereinbefore pointed out, the closure members 42 are translatable between one of a plurality of positions namely, a closed position with respect to the frame 24, and another of said plurality of positions, namely, an open position with respect thereto. In accordance with the above construction, it will now be understood that there is presented a pivotal path of translation along which the rearwardly disposed closure member is translated between the aforesaid plurality of positions. And, there is presented a compound path of translation between the positions along which the forwardly disposed closure member is moved. More particularly, and with particular reference to FIGURE 3, this closure member will be pivotally translated in a generally clockwise direction, as that end thereof along which the trough 80 extends is generally linearly translated to the full-line or open position illustrated in that figure. This is particularly true since both closure members are pivotally structurally operatively associated with one another, as by means of the hinge assembly 50.

It was also hereinbefore pointed out that the location of the aperture 66 is of particular significance. The same is true with respect to the angle of inclination of the wall 70, which, at least in part, defines the groove 68. Specifically, it is desirable that the closure members 42 be self-retaining in the other of the aforesaid plurality of positions, namely, the open position, as illustrated in full-lines in that figure. This is achieved by the hereinbefore defined location of the aperture 66, relative to the adjacent side wall 26, and disposition of the wall 70 in substantially parallel relationship with respect to the adjacent inclined surface 30. As a result, when the closure members are disposed in the aforesaid other position, they will define a triangle having an apex at the hinge assembly 50, and this hinge assembly will be disposed generally to the left of a vertical, extending through the pivot pins 52. Another approach would be to say that the closure members 42 are self-retaining in an open position, since, when disposed in that position, the pivoted end of the closure members are disposed at a plane of lower level than that end of the closure members having a generally linear movement. The closure members, in addition, are self-positioning in the aforesaid one position, namely, a closed position with respect to the frame 24, as illustrated in any one of FIGURES 2, 4 and 5. This is true not only when the closure members are disposed in that position, but as they approach that position. Thus, once the apex defined by the hinge assembly 50 moves to the right of the aforesaid vertical plane through the pivot pins 52, and the angle of inclination of the inclined surface 30 adjacent the bracket assembly 60 is overcome, the closure members will inherently tend to translate themselves towards their aforesaid closed position. It is considered readily apparent, therefore, that the specific angle of inclination of the surfaces 30 is of particular significance. And, it is also considered readily apparent, that by varying this angle of inclination, the exact location at which the closure members will inherently tend to translate themselves towards their aforesaid closed position can be varied. While it is preferred that the end walls 28 of the frame 24 define a generally isoceles triangle, and thus, the angle of inclination of each of the surfaces 30 is substantially the same, it is within the scope of this invention that the angle of inclination of one surface, and particularly that surface adjacent the bracket assembly 60, be different than that of the other surface. The aforesaid preferred dimension of two inches to the apex 32 has been found to enable obtaining of the desired results, namely, the self-retaining characteristic of the closure members in their open position, and the self-positioning characteristic as they approach their closed position, and when they are disposed in that position. If these characteristics are in any way to be altered, and it is desired that the angle of inclination of each of the surfaces 30 remain the same, then it is necessary merely to vary the aforesaid height to the apex 32. However, if it is desired to present different angles of inclination of the surfaces 30 with respect to one another, then the location of the apex 32 along the length of the end walls 28 may be varied, as well as, but not necessarily, the height thereof.

It will, in addition, be understood that the particular construction, configuration and arrangement of the frame 24 disposes or positions the closure members 42 generally vertically upwardly of and away from the product zone 14 of the cabinet 12. It is within this zone that a suitable and desired temperature level is desired to be maintained, as through the medium of a refrigerating unit (not shown). However, the temperature level at locations outwardly of the product zone 14, increases as, for example, the location at which the closure members are disposed, is approached. There is present, of course, an atmospheric temperature condition externally of the closure apparatus 10 and the cabinet 12. It has been found that by locating, disposing or positioning the closure members 42 upwardly of and away from the frozen product zone 14, that is in a distal or remotely disposed relationship with respect thereto, the differential in temperature existing thereacross is substantially reduced, as opposed to locating the closure members substantially adjacent to, or in substantially immediately overlying relationship with respect to the product zone. As a result, it has been found that there is a substantial, if not complete, elimination of the phenomenon of "frosting" or "sweating" of the transparent portions 46 of the closure members. Some condensate may still form, however, visibility through these transparent portions into the frozen product zone remains unimpaired. By substantially, if not completely, eliminating the possibility of this phenomenon, it will be understood that, as hereinbefore pointed out, the transparent portions 46 may be fabricated of any suitable material. Therefore, the use of a material such as Thermopane need not be invoked. Nor will it be necessary to consider the use of a plurality of panes of glass that will at least partially avoid the possibility of damage or breakage, as well as present at least a substantial degree of visibility therethrough. In accordance with the present invention, the distal or remote location of the closure members 42 with respect to the product zone 14, enables the use of a plastic material, such as plexiglas, as hereinbefore pointed out, which presents the characteristic of a very substantial degree of visibility therethrough, introduces a desired safety factor, and, yet, enables the substantial, if not complete, elimination of the aforesaid phenomenon.

The various dimensional extents of the frame 24, both generally longitudinally and transversely thereof, are particularly adapted to correspond with that of the aperture or opening 20 providing access to the product zone 14, enabling the frame to be positioned upon the lip 22, defined by the upper wall 18. The distance between the side walls 26, the end walls 28, and the opening 20 is not of particular importance. However, it is to be understood that the walls 26 and 28 comprising the frame 24, define a curbing extending completely peripherally about the aperture or opening 20, enabling the presentation of an effective seal to preclude the draining of any material, such as condensate, into the product zone 14. The obtaining of this result does not necessitate fixedly positioning the frame 24 upon the upper wall 18, especially since it is within the ambit of this invention that the closure apparatus 10 be translatable between a plurality of locations. Accordingly, any materials that find their way upon the closure members 42, such as condensate, as when the atmospheric conditions present a high humidity index, will tend to drain in a direction away from the product zone 14. This is particularly true in view of the inclination of the closure members. And, with respect to the other closure member, that is, the generally forwardly disposed closure member, any materials that drain therefrom will move in to the drain trough 80, and particularly the bight 84 thereof. And, as hereinbefore pointed out, any materials that do collect in the trough can be removed by slightly inclining the bight relative to the horizontal.

It will, still further, be understood that the closure apparatus 10, constructed in accordance with the present invention, may be fabricated in units of substantial longitudinal dimensional extent, as illustrated, for example, in FIGURE 4. This type of unit is particularly adapted to be structurally operatively associated with a cabinet 12 having a product zone 14 of substantial longitudinal dimensional extent, and corresponding generally with the same dimension of the closure apparatus. However, the closure apparatus is equally capable of being fabricated in sections of less length, the same being particularly adapted for use with cabinets having a product zone divided into a plurality of compartments of substantially the same dimension as illustrated, for example, in FIGURE 5. Thus, closure apparatus 10 constructed in accordance with the present invention is particularly adapted to enable the conversion of existing installations, though, of course, they can be operatively associated with a cabinet 12 at the time of the latter's fabrication. As pointed out above, it is not necessary for the frame 24 to be fixedly operatively associated upon the upper wall 18, in order to enable the curbing defined by the walls 26 and 28 to present an effective seal precluding draining of materials into the product zone 14. However, if desired, suitable brackets and fasteners (not shown) may be operatively associated with the end walls 28 and with the generally rearwardly disposed side wall 26 for fixedly associating the frame 24 and, therefore, the closure apparatus with a cabinet.

The operation of the closure apparatus 10, constructed in accordance with the principles of the present invention, is considered readily apparent from the above particular description thereof. The closure members 42 when disposed in their aforesaid one or closed position, precludes ingress to and egress from the area enclosed thereby, and, therefore, the product zone 14, since the opaque border portion 44, thereof is positioned upon and in substantial sealing engagement with the inclined surfaces 30. Translation of the closure members to their aforesaid other or open position is effected with facility, particularly in view of the provision of the trough 80, which functions as a handle, and the antifriction slide bars or rollers 78. As the closure members approach their open position, the slide bars are disposed within the groove 68 of the bracket assembly 60. The hinge assembly 50 will now be located generally towards the left of a vertical plane extending through the pivot pins 52 (as viewed in FIGURE 3, for example), enabling the closure members to be self-retained in that position. When it is desired to translate the closure members to their aforesaid closed position, it is merely necessary to grasp the trough or handle 80, and manually move them in a corresponding direction, until the hinge assembly 50 is disposed generally towards the right of the aforesaid plane, and, the angle of inclination of the surface 30 adjacent the bracket assembly 60 is overcome. The closure members will then inherently tend to approach their aforesaid one position, and be self-positioning in their closed position. It has been found that the particular construction, configuration and arrangement of the frame 24, and the particular construction, configuration and arrangement of the closure members 42, and the specific manner in which they are translated between their aforesaid plurality of positions, substantially, if not completely, avoids the introduction of air currents that will, in effect, tend to "fan" the cool air disposed within the frozen product zone 14 outwardly thereof and away therefrom. It has been found, therefore, that the refrigerating unit (not shown), operatively associated with the cabinet 12, need not be constantly operable to maintain the desired temperature level in the frozen product zone 14.

It has been necessary to use certain relative terminology in the aforesaid description, such as "upper," "lower," "vertical," "horizontal," "forwardly," "rearwardly," and the like. This terminology has been used to facilitate an understanding of the present invention. Accordingly, it is intended in its normal and accepted sense, and is, therefore, not to in any way be considered limiting. Rather, when used in the aforesaid description, and if and when used in the ensuing claims, this terminology, and other similar terminology, is to be given the broadest possible interpretation and construction attributable thereto.

While the invention has been shown, illustrated, described and disclosed in terms of an embodiment or modification which has assumed in practice, the scope of the invention should not be deemed to be limited by the precise embodiment or modification herein shown, illustrated, described or disclosed, such other embodiments or modifications intended to be reserved especially as they fall within the scope of the claims here appended.

What is claimed is:

1. Closure apparatus particularly adapted for use with a cabinet having a frozen product zone in which frozen products are disposed, said cabinet having an aperture providing access to said frozen product zone completely peripherally about which said closure apparatus is particularly adapted to be disposed to present a seal therebetween precluding drainage thereinto and the leakage of the effected atmosphere therewithin, said closure apparatus comprsing:

a frame; and a plurality of closure members pivotally structurally operatively associated with one another;

one of said closure members being pivotally structurally operatively associated with said frame, enabling the one said closure member to be pivotally translatable between a plurality of positions with respect thereto, and another of said closures to be translatable along a compound path of movement comprising pivotal and generally linear movements between said positions;

said frame and said closure members being so constructed, configured and arranged as to enable said closure members to be self-positioning as they approach and are disposed in one of said plurality of positions, namely, in a closed position with respect to said frame, and self-retaining in another of said positions, namely, an open position with respect thereto;

said frame comprises:

a plurality of end walls;

said end walls being so configured and arranged as to define a plurality of inclined surfaces;

said closure members being particularly adapted to effect a seal with said inclined surfaces when disposed in the aforesaid one position;

bracket assemblies structurally operatively associated with said frame;

said one closure member being pivotally structurally operatively associated with said bracket assemblies;

said bracket assemblies comprising:

a groove, said groove being defined at least in part by:

an inclined wall disposed substantially in parallel relationship with respect to the inclined surfaces of said end walls;

enabling the location at which said closure members are pivotally structurally operatively associated with one another to be disposed generally outwardly of a plane at which the members are associated with said bracket assemblies in the manner aforesaid is located when said members are disposed in their aforesaid other position, and further enabling said closure members to be self-positioning at the aforesaid location of the operative association therebetween as said other closure member is translated in a direction towards said one position, and the angle of inclination of said inclined surfaces is overcome.

2. Closure apparatus as defined in claim 1, wherein: said closure members comprise:

a border portion;

said border portion being particularly adapted to be disposed in sealing mutual cooperative engagement with the frame at the inclined surfaces thereof when said closure members are disposed in their aforesaid one position; and a transparent portion;

said closure members, when self-positioned in their aforesaid one position, being disposed in a distal relationship with respect to the frozen product zone of a cabinet, enabling the substantial, if not complete, elimination of any sweating thereof, and further enabling the drainage of any materials disposed and even formed thereupon away from said zone, and into said drain trough.

3. Closure apparatus as defined in claim 2, wherein: the transparent portion of said closure members is fabricated of a plastic material.

4. Closure apparatus as defined in claim 3, wherein: another of said closure members comprises:

antifriction slide bars structurally operatively associated therewith;

said slide bars being particularly adapted to be translated along the inclined surfaces of the end walls of said frame as said closure members are translated between said plurality of positions.

5. Closure apparatus as defined in claim 4, wherein:
said other closure member further comprises:
a drain trough particularly adapted to receive materials that drain from said closure members; and
enabling said closure members to be translated between said plurality of positions.

6. Closure apparatus particularly adapted for use with a cabinet having at least one product zone, said apparatus comprising:
a frame, said frame comprising:
a plurality of side walls;
a plurality of end walls;
bracket assemblies;
a plurality of closure members;
one of said closure members being pivotally connected to said bracket assemblies, and said closure members being pivotally connected with one another;
enabling said closure members to be self-positioning as they approach one position with respect to said frame, and self-retaining in another position relative to thereto;
said bracket assemblies comprise:
an aperture located at a plane disposed outwardly of one of said side walls; and
a groove defined by:
a wall disposed in parallel relationship with said inclined surfaces; and wherein:
another of said closure members comprise:
a plurality of bars positionable within the groove of said bracket assemblies when said closure members are disposed in their other position.

7. Closure apparatus as defined in claim 6, wherein:
said other closure member comprises:
a trough positioned upon the border portion thereof;
said trough defining, in addition, a handle for translating said closure members between said plurality of positions.

8. Closure apparatus particularly adapted for use with a cabinet having at least one product zone, said apparatus comprising:
a frame, said frame comprising:
a plurality of side walls; and
a plurality of end walls having:
inclined surfaces;
bracket assemblies comprising:
an aperture located at a plane disposed outwardly of one of said side walls; and
a groove defined by:
a wall disposed in parallel relationship with said inclined surfaces; and
a plurality of closure members;
one of said closure members being pivotally connected to said bracket assemblies, and said closure members being pivotally connected with one another, and comprising:
a border portion;
a transparent portion;
the border portion of said closure members being particularly adapted to be disposed in sealing relationship with the inclined surfaces of said frame, and with the side walls thereof;
another of said closure members comprising:
a plurality of bars positionable within the groove of said bracket assemblies when said closure members are disposed in one of a plurality of positions; and
a trough positioned upon the border portion thereof;
said trough defining, in addition, a handle for translating said closure members between said positions;
enabling said closure members to be self-positioning as they approach another of said positions with respect to said frame, and self-retaining in said one position relative thereto.

9. In combination:
a cabinet particularly adapted to have products disposed therewithin, and comprising:
at least one product zone;
an aperture providing access to said product zone; and
closure apparatus positioned upon said cabinet and about said aperture;
said apparatus comprising:
a frame having:
a plurality of side walls; and
a plurality of end walls having inclined surfaces;
bracket assemblies;
said walls defining:
a curbing presenting a seal about said aperture;
a plurality of closure members particularly adapted to be disposed in sealing relationship with the inclined surfaces of said frame, and with the side walls thereof;
one of said closure members being pivotally connected to said bracket assemblies, and such closure members being pivotally connected with one another;
enabling said closure members to be self-positioning as they approach one position with respect to said frame, and self-retaining in another position relative thereto;
said bracket assemblies comprise:
an aperture located at a plane disposed outwardly of one of said side walls; and
a groove defined by:
a wall disposed in parallel relationship with said inclined surfaces; and wherein:
another of said closure members comprise:
a plurality of bars positionable within the groove of said bracket assemblies when said closure members are disposed in their other position.

10. The combination as defined in claim 9, wherein:
said other closure member comprises:
a trough positioned upon the border portion thereof;
said trough defining, in addition, a handle for translating said closure members between said plurality of positions.

11. In combination with a cabinet having at least one product zone and an aperture providing access thereto, the improvement comprising:
closure apparatus particularly adapted to be positioned upon said cabinet and about said aperture, and comprising:
a frame, said frame comprising:
a plurality of side walls;
a plurality of end walls having inclined surfaces;
bracket assemblies;
a plurality of closure members having border portions;
one of said closure members being pivotally connected to said bracket assemblies, and said closure members being pivotally connected with one another
enabling said closure members to be self-positioning as they approach one position with respect to said frame, and self-retaining in another position relative to thereto;
the border portion of said closure members being particularly adapted to be disposed in sealing relationship with the inclined surfaces of said frame, and with the side walls thereof;
said bracket assemblies comprise:
an aperture located at a plane disposed outwardly of one of said side walls; and
a groove defined by:
a wall disposed in parallel relationship with said inclined surfaces; and wherein:
another of said closure members comprise:
a plurality of bars positionable within the groove of said bracket assemblies when said closure members are disposed in their other position.

12. In the combination as defined in claim 11, wherein:
said other closure member comprises:
a trough positioned upon the border portion thereof;
said trough defining, in addition, a handle for translating said closure members between said plurality of positions.

13. In combination with a cabinet having a product zone and an aperture providing access thereto, the improvement comprising:
closure apparatus particularly adapted to be positioned on said cabinet and about said aperture, and comprising:
a frame, said frame comprising:
a plurality of side walls; and
a plurality of end walls having:
inclined surfaces;
bracket assemblies comprising:
an aperture located at a plane disposed outwardly of one of said side walls; and
a groove defined by:
a wall disposed in parallel relationship with said inclined surfaces; and
a plurality of closure members;
one of said closure members being pivotally connected to said bracket assemblies, and said closure members being pivotally connected with one another, and comprising:
a border portion;
a transparent portion;
the border portion of said closure members being particularly adapted to be disposed in sealing relationship with the inclined surfaces of said frame, and with the side walls thereof;
another of said closure members comprising:
a plurality of bars positionable within the groove of said bracket assemblies when said closure members are disposed in one of a plurality of positions; and
a trough positioned upon the border portion thereof;
said trough defining, in addition, a handle for translating said closure members between said positions;
enabling said closure members to be self-positioning as they approach another of said positions with respect to said frame, and self-retaining in said one position relative thereto.

14. Apparatus comprising
a cabinet having a product zone defined in part by an upper generally horizontal wall having an opening therethrough of lesser extent than the upper wall, the opening providing access to the product zone; and
closure apparatus comprising
a frame having walls extending about the periphery of the opening, at least two of the walls being spaced opposite each other and extending upwardly from the upper wall, the two walls having inclined surfaces providing an apex;
a plurality of closure members;
first means pivotally attaching one of the closure members to the apparatus for pivotal movement about a first axis generally perpendicular to the two walls, the one closure member being pivotable from a first position overlying the inclined surfaces between the first axis and the apex and a second position inclined from the vertical in a direction away from the apex;
second means pivotally attaching another of the closure members to the one closure member for pivotable movement therebetween about a second axis generally parallel to the first axis;
the one closure member being of sufficient extent to extend from the first axis to the apex; and
the another closure member being of sufficient extent to extend from the apex at least to the frame.

15. The apparatus of claim 14 wherein
the remaining walls of the frame extend upwardly from the cabinet to the lowest portion of the two walls;
the another closure member extends beyond the frame; and
further comprising
trough structure on the free end of the another closure member.

16. The apparatus of claim 14 further comprising:
a bracket assembly on one of the two walls adjacent the first axis, the bracket assembly providing a slot generally parallel to the inclined surface adjacent thereto and having an open end facing in the direction of the apex; and
an elongate member on the another closure adjacent the free end thereof, the elongate member extending generally in the same direction as the axes and positioned to be received in the slot when the first closure member is in the second position.

17. The apparatus of claim 14 wherein
the remaining walls of the frame extend upwardly from the cabinet to the lowest portion of the two walls;
the first means is so constructed and arranged as to dispose the first axis beyond the confines of the frame; and
further comprising:
means cooperating between the closure members and the frame walls for sealing therebetween when the closure members are disposed in overlying relation to the frame walls.

18. The combination of claim 14 wherein at least one of the closure members is inclined and further comprising a trough on the lower portion of the one closure member for receiving condensate from the inclined closure member.

References Cited
UNITED STATES PATENTS

| | | | |
|---|---|---|---|
| 1,295,830 | 2/1919 | Lichtenstein | 160—213 X |
| 1,524,249 | 1/1925 | Jacuis et al. | 312—300 |
| 1,697,582 | 1/1929 | Wicke | 312—114 |
| 1,998,500 | 4/1935 | Fritz | 312—140 X |
| 2,585,645 | 2/1952 | Freitag | 160—206 |
| 2,655,419 | 10/1953 | Achs | 312—138 X |
| 3,241,899 | 3/1966 | Donker | 312—116 |

BOBBY R. GAY, *Primary Examiner.*

J. L. KOHNEN, *Assistant Examiner.*